United States Patent
Zhang et al.

(10) Patent No.: US 11,624,757 B2
(45) Date of Patent: Apr. 11, 2023

(54) MODELING POSES OF TRACKED OBJECTS BY PREDICTING SENSOR DATA

(71) Applicant: Meta Platforms, Inc., Menlo Park, CA (US)

(72) Inventors: Boyang Zhang, Cupertino, CA (US); Joel Amado Hesch, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 471 days.

(21) Appl. No.: 16/291,228

(22) Filed: Mar. 4, 2019

(65) Prior Publication Data

US 2020/0284820 A1     Sep. 10, 2020

(51) Int. Cl.
  *G01P 15/00*       (2006.01)
  *G01C 19/00*       (2013.01)
  *G06N 5/02*        (2023.01)

(52) U.S. Cl.
  CPC .............. *G01P 15/00* (2013.01); *G01C 19/00* (2013.01); *G06N 5/02* (2013.01)

(58) Field of Classification Search
  CPC ........... G01P 15/00; G01C 19/00; G06N 5/02; G06F 3/017; G06F 3/0346; G02B 27/017
  See application file for complete search history.

(56) References Cited

U.S. PATENT DOCUMENTS 10,433,773  B1 * 10/2019  Budiman ............ A61B 5/14532
RE48,056   E  *  6/2020  Hoffberg ............... G16H 40/67
2012/0036016 A1    2/2012  Hoffberg et al.
2013/0158928 A1 *  6/2013  Hogdal ................. G01C 21/06
                                                  702/104
2014/0214374 A1 *  7/2014  Haas ....................... G06F 30/20
                                                  703/2
2015/0193949 A1    7/2015  Katz et al.
2016/0364013 A1 * 12/2016  Katz ...................... G06F 3/011
2017/0206712 A1 *  7/2017  Petrovskaya ........... G06F 3/005
(Continued)

FOREIGN PATENT DOCUMENTS

EP           2008697 A1    12/2008
WO      WO 2017/062186 A1   4/2017

OTHER PUBLICATIONS

Wikipedia: Interpolation <https://en.wikipedia.org/w/index.php?title=interpolation&oldid=882834242> version dated Feb. 11, 2019. (Year: 2019).*

(Continued)

*Primary Examiner* — Hyun D Park
(74) *Attorney, Agent, or Firm* — Fenwick & West LLP (57) ABSTRACT

A platform system receives sensor data describing the state and orientation of a tracked object and models the pose of the tracked object to determine user interactions with the platform system. To ensure that incorrect sensor data due to a saturation event or connection loss does not impact user experience, the platform system identifies regions for correction in sensor data streams based on the sensor data being at or above a saturation limit or not being received. The platform system predicts sensor data for an identified region of correction by applying a fit corresponding to points adjacent to the region for correction and determining predicted sensor data using the applied fit. The predicted sensor data is used to correct the modeled pose for the tracked object.

12 Claims, 6 Drawing Sheets

(56) References Cited

U.S. PATENT DOCUMENTS

| | | | |
|---|---|---|---|
| 2017/0322626 A1* | 11/2017 | Hawkes | A63F 13/28 |
| 2019/0234920 A1* | 8/2019 | Rangel | G01D 18/00 |
| 2020/0134839 A1* | 4/2020 | Sevostianov | G06F 3/014 |

OTHER PUBLICATIONS

PCT International Search Report and Written Opinion, PCT Application No. PCT/US2020/017420, dated Jun. 22, 2020, 10 pages.

\* cited by examiner

MODELING POSES OF TRACKED OBJECTS BY PREDICTING SENSOR DATA

BACKGROUND

This disclosure relates generally to modeling poses for tracked objects, and more particularly to modeling poses for tracked objects by predicting sensor data.

Objects such as controllers and headsets allow users to interact with platform systems by using the state and orientation of an object to identify motions, selections, and other actions performed by the user. Sensors such as gyroscopes, magnetometers, and accelerometers are attached to the object and used to collect data during operation of the object. The platform system uses the data received by the sensors to track movements of the object and model the pose of the object to determine user interactions with the platform system in near real-time. In platform system applications such as virtual reality, accurately and quickly modeling the pose of the tracked object and executing actions and interactions indicated by a user is essential to a realistic user experience with the system.

A problem arises when sensor data is lost or inaccurate. In one example, incorrect sensor data may be caused when sensor data packets are not received by the platform system (e.g., sensor data packets are blocked by a physical obstacle; a connection between the tracked object and the platform system is temporarily unavailable; etc.). In another example, incorrect sensor data may be caused due to sensor saturation. Sensor saturation occurs when a real-world measurement is beyond a sensor's capacity to accurately record. During the sensor saturation event, data may be represented as being at a threshold saturation limit even if the real-world measurement surpasses the saturation value. Incorrect sensor data may result in an incorrect pose being represented by the platform system, causing lag or inaccurately modeled actions on the system and negatively impacting the user experience on the platform system.

SUMMARY

A platform system identifies a region of sensor data for correction from a sensor data stream and uses sensor data surrounding the identified region to predict sensor data within the region. The platform system receives a sensor data stream including data describing the movement and positioning of a tracked object paired with the platform system and models the pose of the tracked object based on the sensor data stream in near real-time. During operation of the tracked object, the platform system identifies a region in the sensor data stream that is likely incorrect and may fail to reflect the actual environment to be measured around the sensor. For example, the region is determined based on sensor data for an amount of time being above a saturation limit for the associated sensor. In another example, the region is determined based on a lack of sensor data for an amount of time.

The platform system identifies sensor data adjacent to the region for correction and determines an entry slope and an exit slope to the region based on the adjacent sensor data. In one embodiment, the platform system uses two points adjacent to each side of the region for correction to determine the entry and exit slopes. The platform system applies a fit corresponding to the determined entry and exit slopes. For example, the platform system applies a polynomial fit to the region for correction. The platform system uses the applied fit to determine predicted sensor data for the region for correction and modifies the modeled pose of the tracked object based on the predicted sensor data.

By modifying the modeled pose of the tracked object based on the predicted sensor data for the region for correction, the platform system reduces the impact of incorrect sensor data on the position and movement of the tracked object in near real-time.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
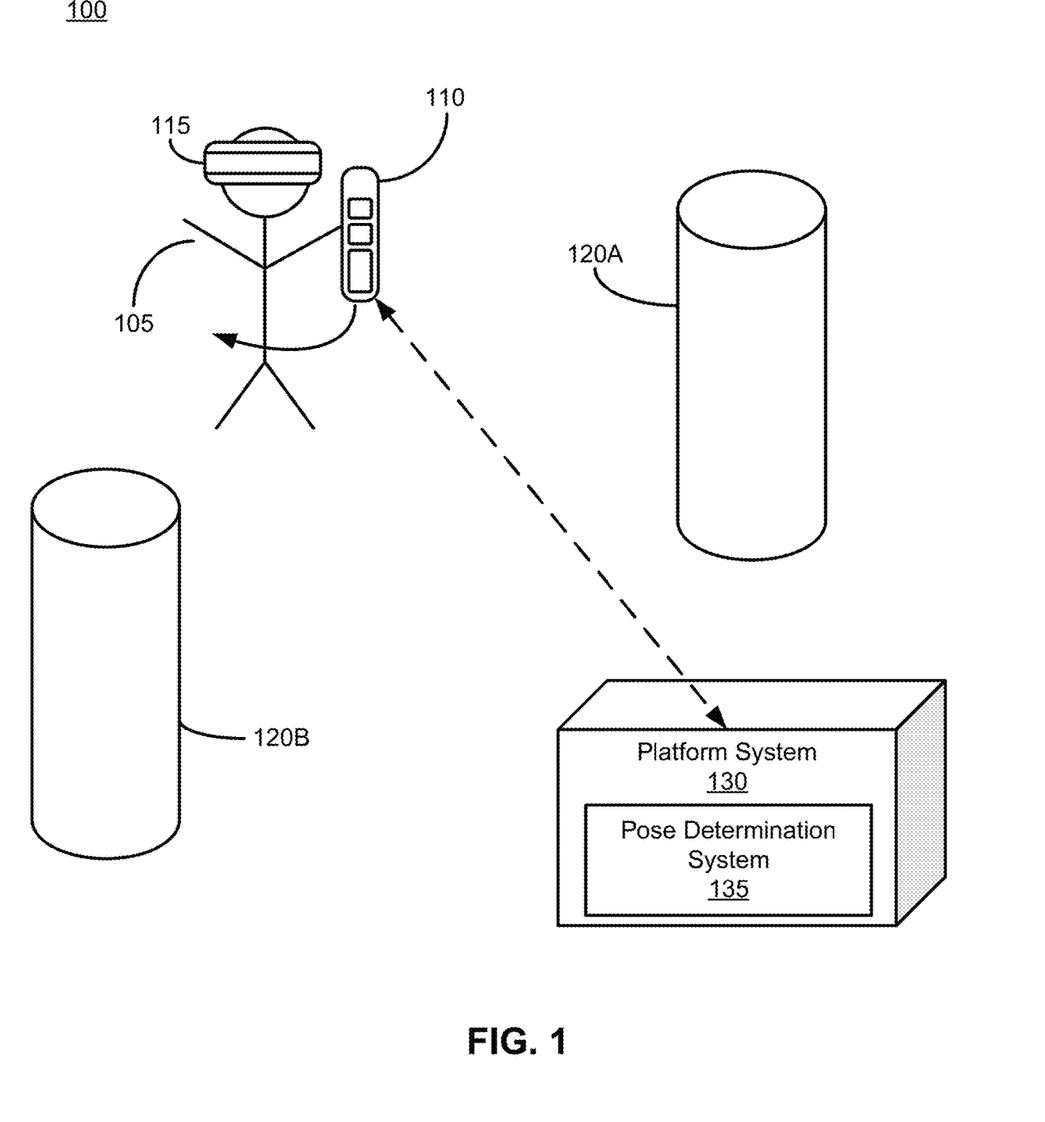
FIG. 1 is a block diagram of a system environment in a platform system including a pose determination system operates, in accordance with an embodiment.

FIG. 1 is a block diagram of a system environment 100 for a platform system 130. The system environment 100 shown by FIG. 1 comprises a user 105 operating a controller 110 and a headset 115 to interact with the platform system 130 and one or more obstacles 120. In an embodiment, the platform system 130 is a virtual reality system. In alternative configurations, different and/or additional components may be included in the system environment 100. For example, the system environment 100 may include multiple users, controllers, and headsets.

Users 105 interact with the platform system 130 using one or more controllers 110, headsets 115, or other components. Controllers 110 and headsets 115 communicate with the platform system 130 via a wireless or wired communication to exchange information. For example, the platform system 130 transmits information describing applications of the platform system accessible to the user 105, such as games, virtual reality, communications programs, Internet browsing, and others. Based on user input transmitted via the controllers 110 and headsets 115, the user 105 accesses and interacts with the content of the platform system.

In some embodiments, controllers 110 are handheld devices that include one or more sensors describing the state, movement, or position of the controller at a given point in time. For example, controllers 110 include sensors such as gyroscopes, accelerometers, and magnetometers. The sensors collect data that is transmitted to the platform system 130 to use as input to the system. For example, sensors detect information such as rotation and acceleration reflecting gestures made by the user 105, movement and position of the user and the controllers 110 relative to the platform system 130, and the like. Controller sensors are often associated with saturation limits that may impact the accuracy of data collected by the sensor. For example, sensors have a manufacturer or experimental saturation limit above which readings are no longer accurate. Real-world movements or events that exceed the saturation limit may result in incorrect or inaccurate data being collected by the sensors of the controllers 110 and transmitted to the platform system 130.

In one embodiment, headsets 115 are linked via a wireless connection to the controllers 110 and the platform system 130. In another embodiment, headsets 115 contain the platform system 130 and are linked via a wireless connection to the controllers 110. The headsets 115 include additional sensors that collect data that acts as input to the platform system 130. For example, sensors on the headsets 115 detect and transmit information such as head movement of the user 105, direction of the user's line of sight, movement and position of the user relative to the environment, the position and orientation of the headset 115 relative to the controllers 110 and the environment, and the like.

The system environment 100 may additionally include one or more obstacles 120 that may impact wireless communications between the platform system 130, the headset 115, and the controller 110. For example, the system environment 100 includes a user's body, walls, external wireless signals, or other large objects that interrupt or delay receipt by the platform system 130 of data streams transmitted by the controller 110 or the headset 115.

The platform system 130 includes a pose determination system 135 that uses the received data streams from the controllers 110 and headsets 115 to identify state and orientation information about the controllers, headsets, and users 105. For example, the pose determination system 135 uses gyroscope data, accelerometer data, and magnetometer data from a controller 110 to model a pose for the controller in near real-time. In other examples, other rigid objects connected to the platform system 130 and including sensors, such as headsets 115, are tracked by the pose determination system 135. The modeled pose for the tracked object is used to identify actions and interactions made by the user with the platform system 130. Because incorrect data due to saturation events for sensors or due to data loss may result in inaccurately modeled poses for tracked objects, the pose determination system 135 predicts sensor data for sensor data identified as incorrect. The predicted sensor data is used to modify the modeled pose of the tracked objects. The use of predicted sensor data and modified modeled poses ensures that the platform system 130 renders the state of the tracked objects accurately to real-world positions, movements, and states by correcting for identified regions in the sensor data steam with incorrect data.

Figure 2:
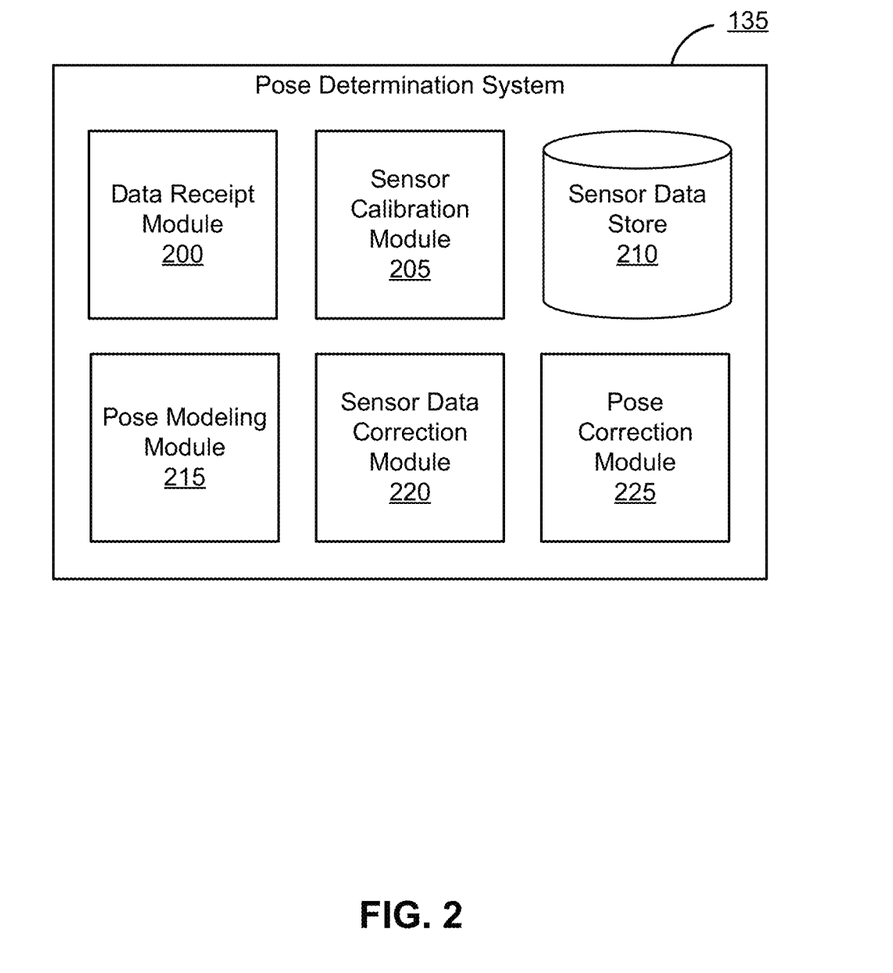
FIG. 2 is a block diagram of an architecture of a pose determination system, in accordance with an embodiment.

FIG. 2 is a block diagram of an architecture of the pose determination system 135. The pose determination system 135 shown in FIG. 2 includes a data receipt module 200, a sensor data store 205, a sensor calibration module 210, a pose modeling module 215, a sensor data correction module 220, and a pose correction module 225. In other embodiments, the pose determination system 135 may include additional, fewer, or different components for various applications.

The data receipt module 200 receives sensor data in real-time or near real-time from one or more sensors on a tracked object paired to the platform system 130. The data receipt module 200 transmits the received sensor data to the sensor calibration module 210. In one embodiment, sensor data received by the data receipt module 200 is associated with metadata identifying an object type, a sensor type, or a sensor identifier, such that sensor data is grouped into a sensor data stream identified by a sensor type or identifier for the tracked object. For example, the data receipt module 200 receives a gyroscope data stream, an accelerometer data stream, and a magnetometer data stream. In some embodiments, the data receipt module 200 receives additional sensor data from one or more sensors associated with other components of the system environment 100. For example, when the tracked object is a controller 110, the data receipt module 200 receives additional sensor data from sensors associated with a headset 115.

The sensor calibration module 210 applies one or more calibration parameters to received sensor data. In one embodiment, calibration parameters are used to convert received sensor data into a form useable by the pose modeling module 215 and other modules of the pose determination system 135. In another embodiment, calibration parameters are used to adjust received sensor data for error over time or due to events occurring during operation of the tracked object. For example, the sensor calibration module 210 applies calibration parameters to sensor data received from the data receipt module 200 during operation of the tracked object. In another example, the sensor calibration module 210 adjusts the received sensor data by a constant c responsive to receiving residual sensor data from the pose modeling module 215 due to a static event. A static event occurs when a tracked object is at rest relative to the environment, such that the expected sensor data describing movement of the tracked object is zero. Residual sensor data is non-zero sensor data that occurs during a static event. The sensor calibration module 210 identifies the residual sensor data as erroneous and determines a constant c to subtract the residual sensor data from the incoming data stream. The sensor calibration module 210 transmits the calibrated sensor data to the sensor data store 210.

The sensor data store 210 stores and maintains one or more sensor data streams received by the data receipt module 200. Sensor data received by the data receipt module 200 is stored in association with a sensor type or sensor identifier and calibrated by the sensor calibration module 205. The sensor data is updated in real-time or near real-time based on incoming data streams. In one embodiment, the sensor data store 210 maintains at least a subset of historical sensor data. For example, the sensor data store 210 maintains historical sensor data for the duration of an active session between the platform system 130 and the tracked object. In another example, the sensor data store 210 maintains historical sensor data for a specific amount of time (e.g., the last five minutes; the last hour; the last day).

The pose modeling module 215 models poses of tracked objects in near real-time based on sensor data streams received from a tracked object. During operation of the tracked object and platform system 130, the pose modeling module 215 accesses sensor data streams stored in the sensor data store 205 (or receives them directly from the sensor calibration module 200) and uses the sensor data streams to determine a pose for the tracked object at a given time. In one embodiment, the pose modeling module 215 identifies an initial pose of the tracked object (e.g., at the start of a connection; when the tracked object is identified by the platform system 130 or another object in the environment; etc.) and, based on incoming sensor data, determines updates to the pose based on tracked movements made by the user 105 with the tracked object. For example, the pose modeling module 215 determines that the tracked object is at a position (x, y, z) relative to the environment at a time $t=t_0$. Based on gyroscope, accelerometer, magnetometer, or other sensor data, the pose modeling module 215 determines that the tracked object is at a second position $(x+c_1, y+c_2, z+c_3)$ at a second time $t=t_1$. In some embodiments, the pose modeling module 215 additionally identifies other pose information about the tracked object, such as velocity, angular velocity, acceleration, orientation, direction and angle, and the like, based on sensor data streams. The pose modeling module 215 transmits the modeled pose to the pose correction module 225 for use by the platform system 130.

The sensor data correction module 220 identifies regions in sensor data stream for correction and predicts sensor data for the region for correction in near real-time. The sensor data correction module 220 accesses sensor data stored in the sensor data store 210. A region for correction is identified when sensor data for an amount of time is identified as likely to be an inaccurate representation of real-world actions by the user 105. For example, the sensor data correction module 220 identifies a region for correction based on sensor data being at or above a saturation limit associated with the sensor or sensor type. In another example, the sensor data correction module 220 identifies a region for correction based on sensor data not being received for an amount of time.

In one embodiment, the sensor data correction module 220 predicts sensor data for the region for correction based on sensor data adjacent to the identified region. The sensor data correction module 220 identifies one or more sets of data points adjacent to the region for correction (e.g., a set of data points adjacent to the beginning of the region and a set of data points adjacent to the end of the region). Using the sets of data points, the sensor data correction module 220 generates predicted sensor data within the region for correction based on an assumption that real-world actions are unlikely to result in sensor data streams including discontinuities. For example, the sensor data correction module 220 identifies two points adjacent to the beginning of the region for correction and two points adjacent to the end of the region for correction. The identified sets of two points are used by the sensor data correction module 220 to determine an entry slope and an exit slope, respectively. In other examples, the sensor data correction module 220 may use a different number of adjacent points or perform different or additional mathematical functions using the adjacent points.

The sensor data correction module 220 applies a fit to the region for correction such that the fit corresponds to the entry and exit slopes. In one embodiment, the applied fit is determined based on a sensor type associated with the sensor data stream. For example, the sensor data correction module 220 identifies that the sensor data stream is collected by a gyroscope sensor type and applies a second or higher degree polynomial fit to the region for correction. In another example, the sensor data correction module 220 identifies that the sensor data stream is collected by an accelerometer and applies a piecewise linear fit to the region for correction. In other examples, other sensor types and fits may be used by the sensor data correction module 220. In one embodiment, fits are determined for sensor types based on experimental data for each sensor type. For example, based on one or more sets of sensor data captured by a sensor type and known to accurately reflect real-world movements, the sensor data correction module 220 determines that a given fit more accurately reflects trends in the sensor data. The identified fit is then applied to correct sensor data associated with the sensor type.

The sensor data correction module 220 uses the applied fit to generate a series of predicted sensor data points. In one embodiment, a number and frequency of the predicted sensor points is determined based on the adjacent sensor data frequency and duration of time of the region for correction. For example, if a region for correction is determined to begin at $t=t_{start}$ and end at $t=t_{start}+c \cdot dt$, where dt is a sampling period of a sensor, and the adjacent points are associated with $t=t_{start}-2 \cdot dt, t_{start}-dt \ldots t_{start}+(c+1) \cdot dt, t_{start}+(c+2) \cdot dt$, the sensor data correction module 220 generates sensor data for $t=t_{start}+dt, t_{start}+2 \cdot dt \ldots t_{start}+(c-2) \cdot dt, t_{start}+(c-1) \cdot dt$. The sensor data correction module 220 transmits the predicted sensor data points to the pose modeling module 215 to be used in modifying the modeled pose for the tracked object. In an embodiment, the sensor data correction module 220 additionally transmits the predicted sensor data points to the sensor calibration module 205 for use in recalibrating the sensors of the tracked object.

When there is a correction to a region of the sensor data stream, the pose modeling module 215 determines modifications for modeled poses based on predicted sensor data received from the sensor data correction module 220. Because the pose modeling module 215 receives sensor data streams as data points collected by tracked objects, predicted sensor data points are used as input to a standard model used both during normal operation (e.g., when no corrections are made) and when accounting for corrections. The pose modeling module 215 receives the predicted sensor data and modifies the modeled pose based on the predicted sensor data to more accurately reflect real-world actions of the user 105. The modification is transmitted to the pose correction module 225.

The pose correction module 225 receives a modeled pose from the pose modeling module 215 and transmits the modeled pose to the platform system 130 for use in programs or applications of the platform system. In one embodiment, responsive to the pose correction module 225 receiving a modification for the modeled pose (e.g., due to incorrect sensor data being identified and corrected), the pose correction module applies and transmits the modification with the modeled pose at a current time. In another embodiment, responsive to the pose correction module 225 receiving a modification for the modeled pose, the pose correction module applies a series of modifications over time, such that each modeled pose for an amount of time applies a portion of the total modification, until the received modification has been applied in whole. A gradual modification ensures that the user 105 does not experience any jumps or lags due to the pose of the tracked object experiencing a large or sudden update, while still correcting for error due to previous incorrect sensor information.

Modeling Pose of Tracked Objects by Predicting Sensor Data

Figure 3A:
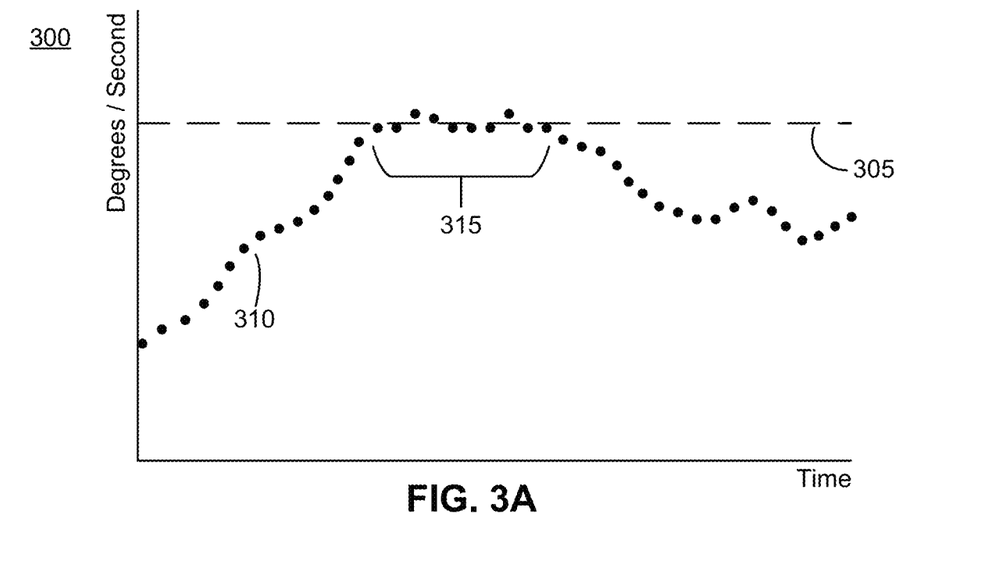
FIGS. 3A-3C are examples illustrating a sensor data stream including a region for correction due to a saturation event and the sensor data stream including corrected sensor data, in accordance with an embodiment.
Figure 3B:
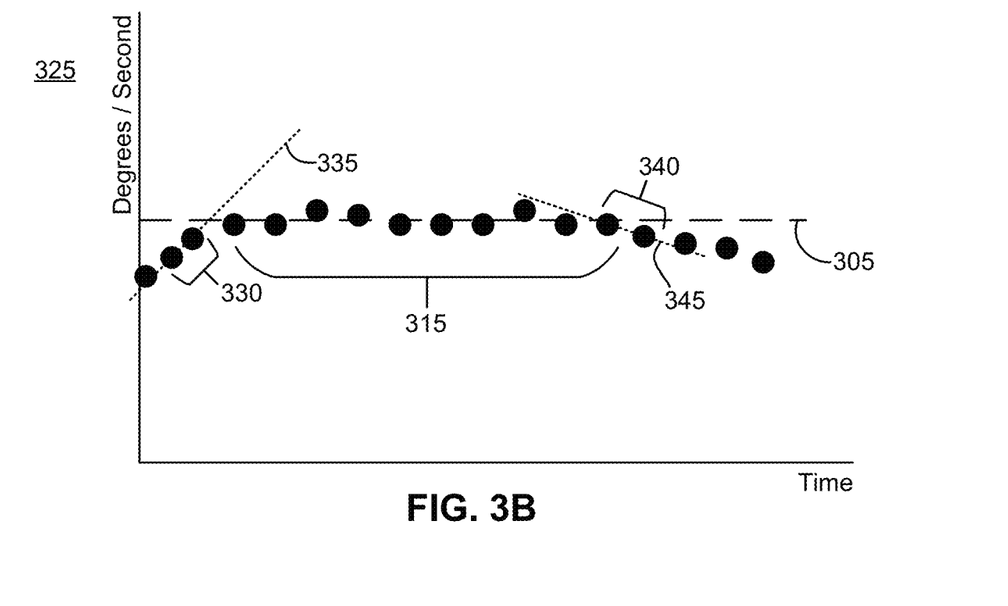
Figure 3C:
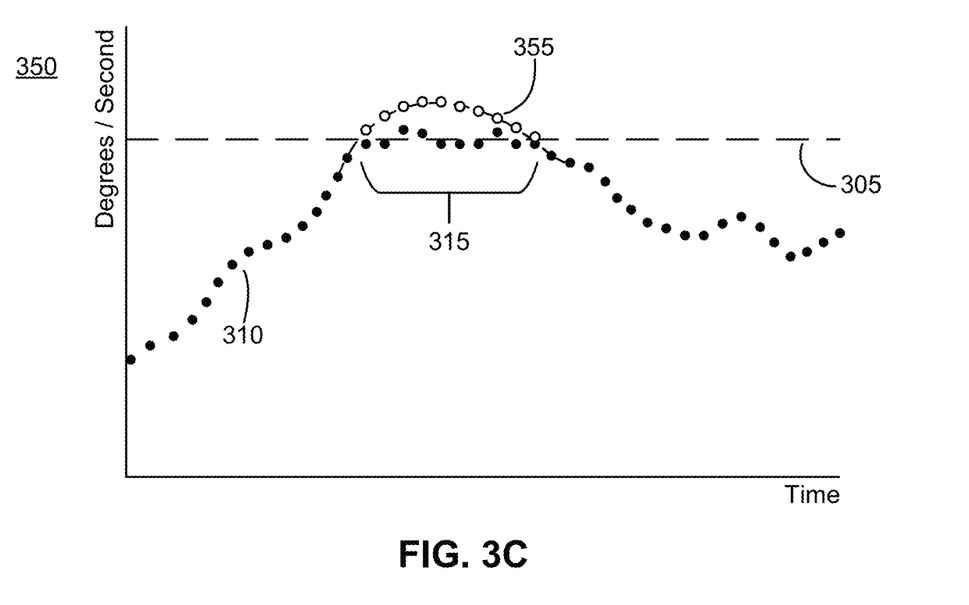

FIGS. 3A-3C are examples illustrating a sensor data stream including a region for correction due to a saturation event and the sensor data stream including corrected sensor data, in accordance with an embodiment.

FIG. 3A illustrates a sensor data stream including a region for correction due to a saturation event. The platform system 130 receives sensor data 310 from a sensor of a tracked object. In the example graph 300, the sensor is a gyroscope measuring the angular velocity of the tracked object in degrees per second. In other examples, different sensors or measurements may be associated with the sensor data stream. The sensor is associated with a saturation limit 305. As described in conjunction with FIG. 1, the saturation limit 305 describes a value at and above which sensor data points are unreliable. For example, for a gyroscope described by a manufacturer as accurate up to 2000 degrees per second with an error of 5 degrees per second, the saturation limit 305 is set at 1995 degrees per second. In other examples, the saturation limit 305 is determined differently or determined based on different accuracy readings.

The platform system 130 identifies a region for correction 315 based on the sensor data 310 being at or above the saturation limit 305. In one embodiment, the platform system 130 identifies the region for correction 315 responsive to a first data point being at or above the saturation limit 305 and begins the correction process prior to the end of the region for correction 315 being identified. In another embodiment, the platform system 130 identifies the region for correction 315 responsive to identifying a first data point being below the saturation limit 305 after the saturation event begins and begins the correction process after the region for correction is identified in full.

FIG. 3B illustrates a region for correction from a sensor data stream including a calculated slope for the adjacent sensor data. Responsive to a region for correction 315 being identified from the sensor data stream 310, the platform system 130 identifies a set of points 330 adjacent to the beginning of the region for correction and a set of points 340 adjacent to the end of the region of correction. The sets of points 330, 340 represent data below the saturation limit 305 of the sensor. In the example shown in FIG. 3B, the sets of points 330, 340 include two points adjacent to the beginning and end of the region for correction respectively. In other examples, additional points may be included in the sets of points 330, 340.

The platform system 130 applies a fit to the region for correction 315 corresponding to an entry slope 335 based on the set of points 330 adjacent to the beginning of the region for correction and an exit slope 345 based on the set of points 340 adjacent to the end of the region for correction. For example, the platform system 130 uses cubic interpolation to predict sensor data for the region for correction 315 by fitting the adjacent sets of points 330, 340 to a cubic function with four unknown variables. In another example, the platform system 130 uses quadratic interpolation to predict sensor data for the region for correction 315 by fitting the adjacent sets of points 330, 340 to a quadratic function with three unknown variables. The platform system 130 operates under the assumption that the movement and orientation of the tracked object has no discontinuities between the set of points 330, 340 (e.g., no gaps or jumps are experienced in the angular velocity of the tracked object). Accordingly, the entry slope 335 and exit slope 345 should correspond to the fit used for predicting sensor data.

FIG. 3C illustrates a sensor data stream including corrected sensor data based on the adjacent sensor data. Based on the entry slope 335 and exit slope 345 determined as described in conjunction with FIG. 3B, the platform system 130 generates a fit 355 describing predicted sensor data for the region for correction 315. In the example of FIG. 3C, the applied fit 355 is a second or higher degree polynomial determined by the platform system 130 to minimize the least squared error of the entry slope 335 and exit slope 345. In other examples as discussed in conjunction with FIG. 2, other fits may be applied based on the sensor type and other factors. The platform system 130 predicts sensor data corresponding to the applied fit 355 for the region for correction 315. The predicted sensor data is used by the platform system 130 to modify the modeled pose to account for errors caused by the incorrect sensor data.

Figure 4A:
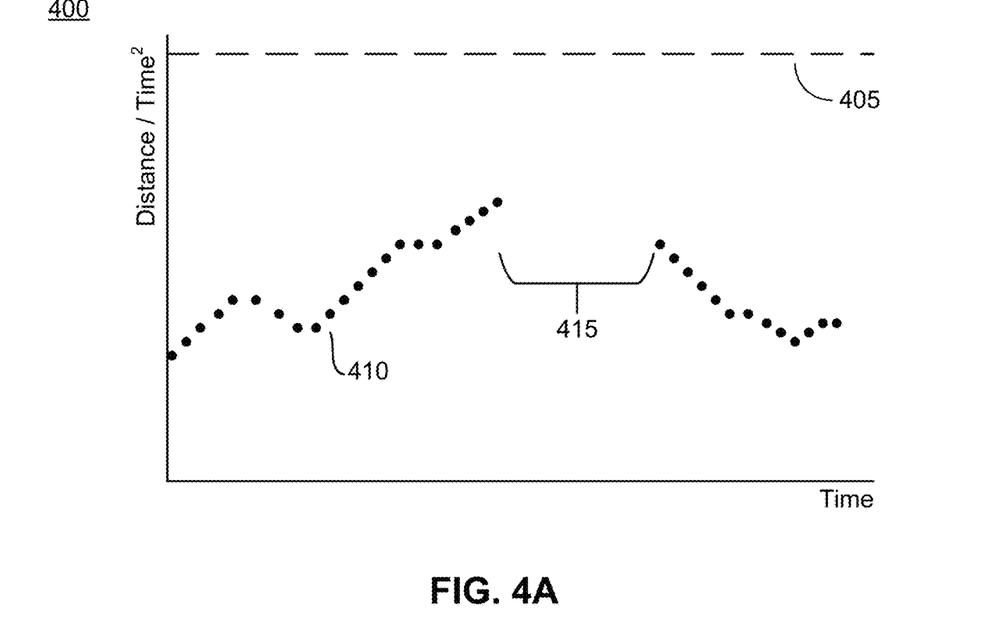
FIGS. 4A-4B are examples illustrating a sensor data stream including a region for correction due to data packet loss and the sensor data stream including corrected sensor data, in accordance with an embodiment.
Figure 4B:
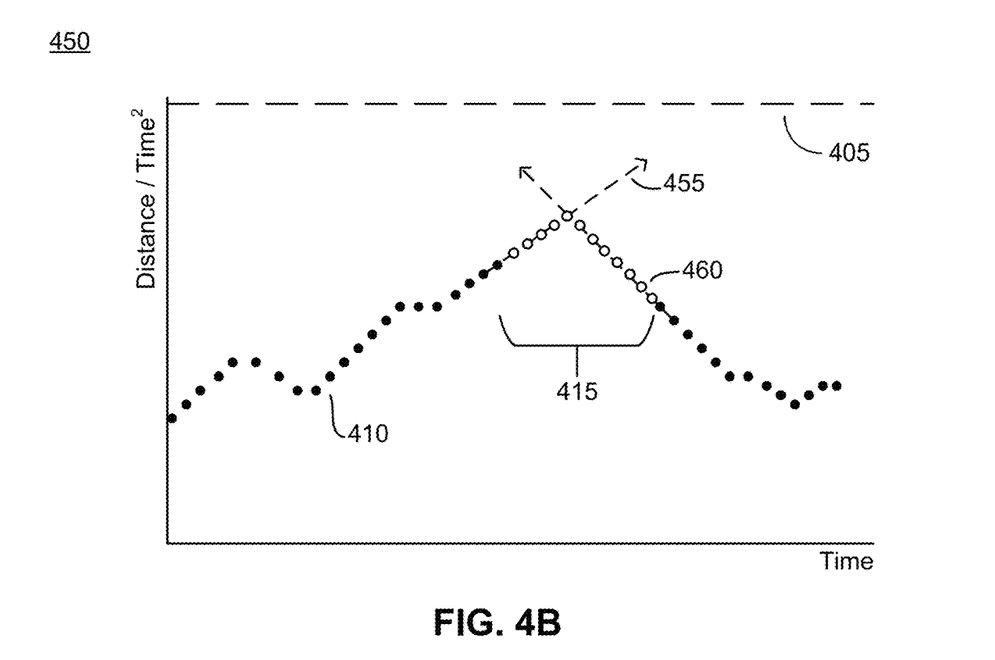

FIGS. 4A-4B are examples illustrating a sensor data stream including a region for correction due to data packet loss and the sensor data stream including corrected sensor data, in accordance with an embodiment.

FIG. 4A illustrates a sensor data stream including a region for correction due to a loss of data packets. The platform system 130 receives sensor data 410 from a sensor of a tracked object. In the example graph 400, the sensor is an accelerometer measuring the acceleration of the tracked object in distance per time squared. In other examples, different sensors or measurements may be associated with the sensor data stream. The sensor is associated with a saturation limit 405. The sensor data stream 410 received by the platform system 130 includes a region for correction 415 based on the sensor data 410 not being received for an amount of time but being below the saturation limit 405 before and after the region. The region for correction 415 is identified as being due to data packet loss. As described in conjunction with FIG. 1, data packet loss occurs when data collected by sensors on the tracked object are unable to be sent to the platform system 130. For example, data packet loss occurs when a data stream from the tracked object is blocked by a physical obstacle (e.g., a wall) or when a wireless connection between the tracked object and the platform system 130 is lost.

FIG. 4B illustrates a sensor data stream including corrected sensor data based on the adjacent sensor data. As described in conjunction with FIG. 3B, the platform system 130 calculates an entry slope and an exit slope using sets of points adjacent to the region for correction 415. The platform system 130 uses the entry slope and exit slope to apply a fit for predicted sensor data in the region for correction 415. In the example of FIG. 4B, the platform system 130 applies a piecewise linear function, such that a first linear fit 455 is applied corresponding to the entry slope and a second linear fit 460 is applied corresponding to the exit slope. In other examples as discussed in conjunction with FIG. 2, other fits may be applied based on the sensor type and other factors. The platform system 130 predicts sensor data corresponding to the applied fits 455, 460 for the region for correction 415. The predicted sensor data is used by the platform system 130 to modify the modeled pose to account for errors caused by the incorrect sensor data.

Figure 5:
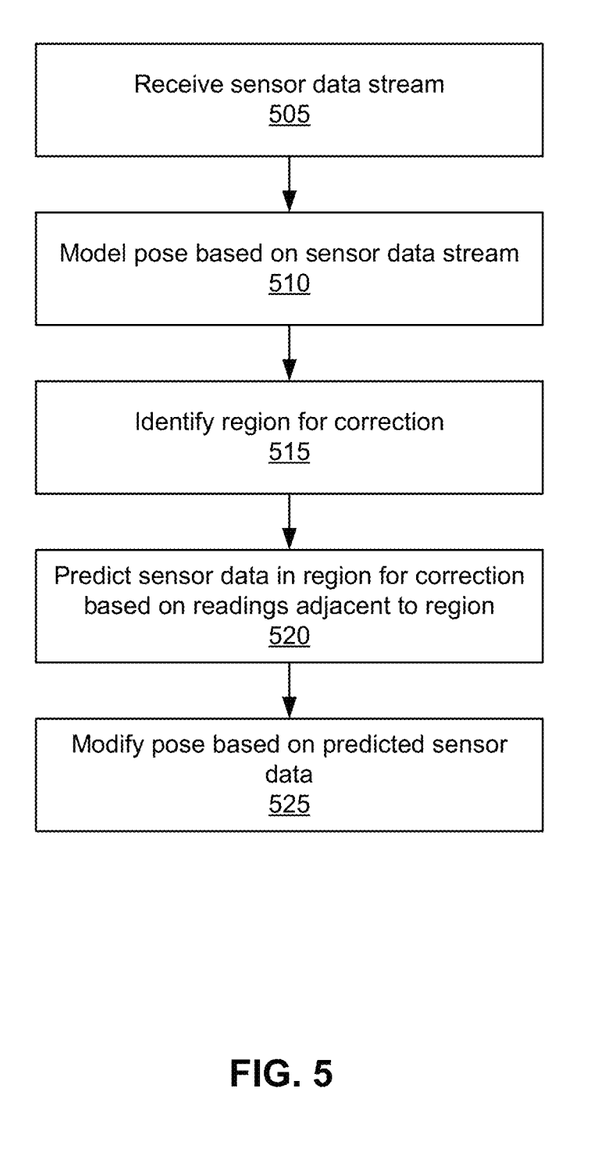
FIG. 5 is a flow diagram of a method for correcting sensor data for use in modifying a pose of a tracked object, in accordance with an embodiment.

FIG. 5 is a flow diagram of a method for correcting sensor data for use in modifying a pose for a tracked object, in accordance with an embodiment. In various embodiments, the method may include different and/or additional steps, and the steps may be performed in different orders than those described in conjunction with FIG. 5.

The platform system 130 receives 505 a sensor data stream from a sensor associated with a tracked object paired to the platform system. For example, the sensor data stream is from a gyroscope, accelerometer, or magnetometer attached to the tracked object. The platform system 130 models 510 the pose of the tracked object based on the sensor data stream. The platform system 130 identifies 515 a region of the sensor data stream for correction. In one example, the region for correction is a region where the sensor data is at or above a threshold saturation limit for the sensor. In another example, the region for correction is a region where no sensor data is received by the platform system 130. The platform system 130 predicts 520 sensor data in the region for correction based on the sensor readings adjacent to the region. For example, the platform system applies a fit to the sensor data stream corresponding to the slopes of the sensor readings adjacent to the reading and predicts, based on the fit, one or more corrected sensor data points. The platform system 130 modifies 525 the pose of the tracked object based on the predicted sensor data.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    collecting, by a plurality of sensors attached to a tracked controller held by a user and a headset worn by the user, sensor data associated with movements and positions of the tracked controller and the headset;
    transmitting the sensor data from the tracked controller and the headset to a virtual reality system;
    modeling, by the virtual reality system, a pose of the tracked controller based on the sensor data;
    identifying, by the virtual reality system, a region for correction in the sensor data;
    determining, by the virtual reality system, a piecewise linear fit based on identifying that the sensor data are collected by at least one accelerometer of the plurality of sensors;
    applying, by the virtual reality system, the determined piecewise linear fit corresponding to points adjacent to the region for correction using a portion of the sensor data to determine predicted sensor data for the region for correction;
    performing, by the virtual reality system, a gradual modification of the modeled pose using the predicted sensor data to generate a modified modeled pose;
    identifying, by the virtual reality system using the modified modeled pose, actions and interactions made by the user with the virtual reality system; and
    rendering, by the virtual reality system using the modified modeled pose, a state of the tracked controller in accordance with a real-world position of the tracked controller for presentation to the user by the virtual reality system.

2. The method of claim 1, wherein identifying the region for correction further comprises:
    identifying a saturation limit for the plurality of sensors; and
    identifying the region in the sensor data that the sensor data is at or above the saturation limit.

3. The method of claim 1, wherein identifying the region for correction further comprises:
    identifying the region in the sensor data wherein no sensor data is received.

4. The method of claim 1, wherein determining the predicted sensor data further comprises:
    determining a slope of readings adjacent to the region for correction; and
    applying the determined piecewise linear fit corresponding to the determined slope.

5. The method of claim 4, wherein the slope is determined based on two of the readings adjacent to the region for correction.

6. The method of claim 1, wherein performing the gradual modification of the modeled pose comprises applying a series of modifications to the modeled pose over time.

7. A non-transitory computer-readable storage medium storing computer program instructions executable by a processor to perform operations comprising:
    collecting, by a plurality of sensors attached to a tracked controller held by a user and a headset worn by the user, sensor data associated with movements and positions of the tracked controller and the headset;
    transmitting the sensor data from the tracked controller and the headset to a virtual reality system;
    modeling, by the virtual reality system, a pose of the tracked controller based on the sensor data;
    identifying, by the virtual reality system, a region for correction in the sensor data;

determining, by the virtual reality system, a piecewise linear fit based on identifying that the sensor data are collected by of at least one accelerometer of the plurality of sensors;

applying, by the virtual reality system, the determined piecewise linear fit corresponding to points adjacent to the region for correction using a portion of the sensor data to determine predicted sensor data for the region for correction;

performing, by the virtual reality system, a gradual modification of the modeled pose using the predicted sensor data to generate a modified modeled pose;

identifying, by the virtual reality system using the modified modeled pose, actions and interactions made by the user with the virtual reality system; and rendering, by the virtual reality system using the modified modeled pose, a state of the tracked controller in accordance with a real-world position of the tracked controller for presentation to the user by the virtual reality system.

8. The non-transitory computer-readable storage medium of claim 7, wherein identifying the region for correction further comprises: identifying a saturation limit for the plurality of sensors; and identifying the region in the sensor data that the sensor data is at or above the saturation limit.

9. The non-transitory computer-readable storage medium of claim 7, wherein identifying the region for correction further comprises: identifying the region in the sensor data wherein no sensor data is received.

10. The non-transitory computer-readable storage medium of claim 7, wherein determining the predicted sensor data further comprises: determining a slope of readings adjacent to the region for correction; and applying the determined type of the piecewise linear fit corresponding to the determined slope.

11. The non-transitory computer-readable storage medium of claim 10, wherein the slope is determined based on two of the readings adjacent to the region for correction.

12. The non-transitory computer-readable storage medium of claim 7, wherein performing the gradual modification of the modeled pose comprises applying a series of modifications to the modeled pose over time.

\* \* \* \* \*

UNITED STATES PATENT AND TRADEMARK OFFICE
CERTIFICATE OF CORRECTION

PATENT NO. : 11,624,757 B2
APPLICATION NO. : 16/291228
DATED : April 11, 2023
INVENTOR(S) : Boyang Zhang et al.

It is certified that error appears in the above-identified patent and that said Letters Patent is hereby corrected as shown below:

In the Claims

In Column 11, Claim 7, Line 3, delete "collected by of at least" and insert -- collected by at least --, therefor.

In Column 11, Claim 7, Lines 18-20, delete "a state............system." and insert the same at Line 17, after "pose," as a continuation point.

In Column 12, Claim 8, Line 1, delete "identifying a saturation limit for the plurality of sensors; and" and insert the same at Line 2, as a new-sub point.

In Column 12, Claim 8, Line 2, delete "identifying the region in the sensor data that the sensor data is at or above the saturation limit." and insert the same at Line 3, as a new-sub point.

In Column 12, Claim 9, Line 6, delete "identifying the region in the sensor data wherein no sensor data is received." and insert the same at Line 7, as a new-sub point.

In Column 12, Claim 10, Line 10, delete "determining a slope of readings adjacent to the region for correction; and" and insert the same at Line 11, as a new-sub point.

In Column 12, Claim 10, Line 11, delete "applying the determined type of the piecewise linear fit corresponding to the determined slope." and insert the same at Line 12, as a new-sub point.

In Column 12, Claim 10, Line 12, delete "determined type of the" and insert -- determined --, therefor.

Signed and Sealed this
Twenty-second Day of August, 2023

Katherine Kelly Vidal
*Director of the United States Patent and Trademark Office*